(12) United States Patent
Cameron et al.

(10) Patent No.: US 7,747,540 B2
(45) Date of Patent: Jun. 29, 2010

(54) ACCOUNT LINKING WITH PRIVACY KEYS

(75) Inventors: Kim Cameron, Bellevue, WA (US); Arun K. Nanda, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 622 days.

(21) Appl. No.: 11/361,780

(22) Filed: Feb. 24, 2006

(65) Prior Publication Data

US 2007/0203848 A1    Aug. 30, 2007

(51) Int. Cl.
G06Q 20/00 (2006.01)
G06F 15/16 (2006.01)
H04L 9/32 (2006.01)

(52) U.S. Cl. ............... 705/67; 726/6; 726/8; 713/168; 713/171

(58) Field of Classification Search ............. 726/6–10; 713/168, 171; 705/67
See application file for complete search history.

(56) References Cited

U.S. PATENT DOCUMENTS

| | | | |
|---|---|---|---|
| 6,058,193 A | 5/2000 | Cordery et al. | |
| 7,562,382 B2* | 7/2009 | Hinton et al. | 726/2 |
| 2002/0152179 A1* | 10/2002 | Racov | 705/67 |
| 2003/0101349 A1 | 5/2003 | Wang | |
| 2003/0149781 A1* | 8/2003 | Yared et al. | 709/229 |
| 2003/0196106 A1 | 10/2003 | Erfani et al. | |
| 2003/0215088 A1 | 11/2003 | Bao | |
| 2003/0229783 A1* | 12/2003 | Hardt | 713/155 |
| 2004/0267672 A1 | 12/2004 | Gray et al. | |
| 2005/0044393 A1* | 2/2005 | Holdsworth | 713/200 |
| 2005/0091492 A1 | 4/2005 | Benson et al. | |
| 2005/0097060 A1 | 5/2005 | Lee et al. | |
| 2005/0136964 A1 | 6/2005 | Le Saint et al. | |
| 2005/0138421 A1 | 6/2005 | Fedronic et al. | |
| 2005/0154875 A1 | 7/2005 | Chao | |
| 2005/0262359 A1 | 11/2005 | Palecek | |
| 2005/0273844 A1 | 12/2005 | Dapkus et al. | |

(Continued)

FOREIGN PATENT DOCUMENTS

EP    1 599 017 A1    11/2005

(Continued)

OTHER PUBLICATIONS

"Liberty ID-FF Architecture Overview", archived in Internet Archive, copyright 2004. Available at <http://web.archive.org/web/20040918065929/www.projectliberty.org/specs/draft-liberty-idff-arch-overview-1.2-errata-v1.0.pdf>.*

(Continued)

Primary Examiner—Andrew J. Fischer
Assistant Examiner—Christopher C Johns
(74) Attorney, Agent, or Firm—Merchant & Gould P.C.

(57) ABSTRACT

A computer system includes a security module programmed to generate a first privacy key for use with secure communications with a first web site, and a second privacy key for use with secure communications with a second web site, the first and second keys being different. The computer system also includes an identity module programmed to receive a request from the first web site for linking a first user account associated with the first web site with a second user account associated with the second web site, and the identity module being programmed to present a user with an option to link the first and second user accounts.

10 Claims, 8 Drawing Sheets

U.S. PATENT DOCUMENTS

| | | | |
|---|---|---|---|
| 2005/0283614 A1* | 12/2005 | Hardt | 713/182 |
| 2006/0048213 A1* | 3/2006 | Cheng et al. | 726/5 |
| 2006/0167823 A1* | 7/2006 | York et al. | 705/76 |
| 2006/0218630 A1* | 9/2006 | Pearson et al. | 726/8 |
| 2008/0014931 A1* | 1/2008 | Yared et al. | 455/432.3 |
| 2008/0016232 A1* | 1/2008 | Yared et al. | 709/229 |
| 2008/0021866 A1* | 1/2008 | Hinton et al. | 707/2 |
| 2008/0059804 A1* | 3/2008 | Shah et al. | 713/186 |
| 2008/0155267 A1* | 6/2008 | Lieber | 713/183 |

FOREIGN PATENT DOCUMENTS

| | | |
|---|---|---|
| KR | 2001-0067759 | 7/2001 |
| KR | 2003-0072830 | 9/2003 |
| WO | WO 02/31679 A1 | 4/2002 |
| WO | WO 2005/043802 A1 | 5/2005 |
| WO | WO 2005/078988 A1 | 8/2005 |

OTHER PUBLICATIONS

Assertions and Protocol for the OASIS Security Assertion Markup Language (SAML) V1.1. OASIS Standard, Sep. 2, 2003. Acquired from <http://www.oasis-open.org/committees/download.php/3406/oasis-sstc-saml-core-1.1.pdf>.*

The Official eBay Guide to Buying, Selling, and Collecting Just About Anything. Kaiser, Laura and Michael Kaiser. 1999, Fireside Publishing. ISBN 0-684-87372-9. Front matter, pp. 17-21 included.*

Security In Computing, $2_{nd}$ Edition. Pfleeger, Charles P. Prentice Hall, Upper Saddle River, New Jersey, USA, 1997. Front matter, back matter, pp. 98-103 included.*

U.S. Appl. No. 11/074,0885 filed Mar. 7, 2005.

Erin Joyce, Internet Website: http://www.internetnews.com/dev-news/article.php/3507241 "Microsoft Moving From Passport to InfoCard," (May 24, 2005).

Notification of Transmittal of the International Search Report and the Written Opinion of the International Searching Authority, or the Declaration mailed Jun. 26, 2007.

Schneider, B., *Applied Cryptography*, 2nd Edition, Chapters 13 and 19, John Wiley & Sons (1996), front cover 1 page, inside cover 1 page, Chapter 13 pp. 303-329, and Chapter 19 pp. 461-482.

* cited by examiner

ACCOUNT LINKING WITH PRIVACY KEYS

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

BACKGROUND

As users continue to increase their reliance on online resources to conduct business and pleasure, the importance of protecting privacy and facilitating secure transactions grows. Encryption of information is one method for providing privacy and security in the online environment. One encryption method involves the use of a public key that is shared openly with others. The public key is used to encrypt a message that is sent to the owner of the public key. The owner then uses a secret key to decrypt the message. The use of advanced cryptography such as public keys functions to counter "phishing" attacks and provides a new level of protection for online users.

One of the potential disadvantages of this type of cryptography is that when a public key is reused at many online sites, the public key becomes a new form of personally-identifying information. The public key can be thought of as a string of bytes that can be used as a "database key" in addition to being a cryptographic key. In this context, a public key can be employed to correlate and track a user's online activities across multiple online resources. For example, two web sites could compare the public keys registered at their sites, and, finding matches, could correlate the purchasing profiles of the owners of those keys in ways a user did not contemplate or sanction.

In addition, although a user will typically want to preserve his or her privacy when conducting online transactions, there are situations in which the user may want to allow web sites to share information about the user. For example, if a first web site offers discounted goods or services to members of a second web site, and the user is member of the second web site, the user may want to allow the first and second web sites to share information about the user so that the user can receive the discount.

Users therefore desire an online environment in which privacy and security concerns are addressed and in which users can control when and how online resources share user information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one aspect, a computer system includes a security module programmed to generate a first privacy key for use with secure communications with a first web site, and a second privacy key for use with secure communications with a second web site, the first and second keys being different. The computer system also includes an identity module programmed to receive a request from the first web site for linking a first user account associated with the first web site with a second user account associated with the second web site, and the identity module being programmed to present a user with an option to link the first and second user accounts.

According to another aspect, a method for communicating with a plurality of web sites includes: generating a first privacy key to communicate securely with a first web site; generating a second privacy key to communicate securely with a second web site; receiving a request for account linking from the first web site to share user information with the second web site; and presenting a user with an option to approve or disapprove of the account linking.

According to yet another aspect, a method for a first web site to link user accounts with a second web site includes: sending a request for account linking from the first web site to share user information with the second web site; receiving a response from the user approving of the account linking; and forwarding a coupon to the second web site to initiate the account linking, the coupon including a linking agreement including a first privacy key associated with the first web site and a second privacy key associated with the second web site, the first and second privacy keys being different.

DESCRIPTION OF THE DRAWINGS

Reference will now be made to the accompanying drawings, which are not necessarily drawn to scale, and wherein.

DETAILED DESCRIPTION

Example embodiments will now be described more fully hereinafter with reference to the accompanying drawings. These embodiments are provided so that this disclosure will be thorough and complete. Like numbers refer to like elements throughout.

Example embodiments disclosed herein relate generally to a plurality of different privacy keys that are generated by a user's computer system for communicating securely with a plurality of web sites. Because the privacy key used to communicate with each web site differs, the use of the privacy keys cannot be used to correlate the user's activities on the different web sites. In some embodiments, the user can allow two or more web sites to share information about the user, including the different privacy keys used at the web sites.

Figure 1:
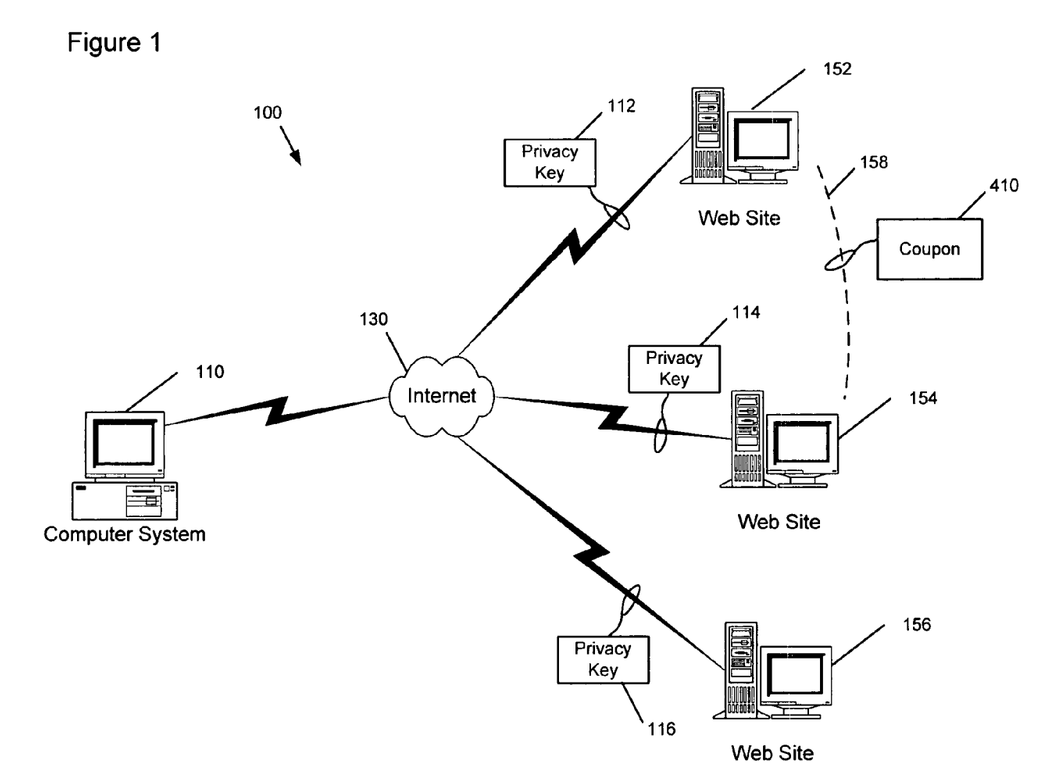
FIG. 1 illustrates an example computing environment in which a computer system is programmed to communicate with a plurality of web sites using a plurality of privacy keys.
Figure 2:
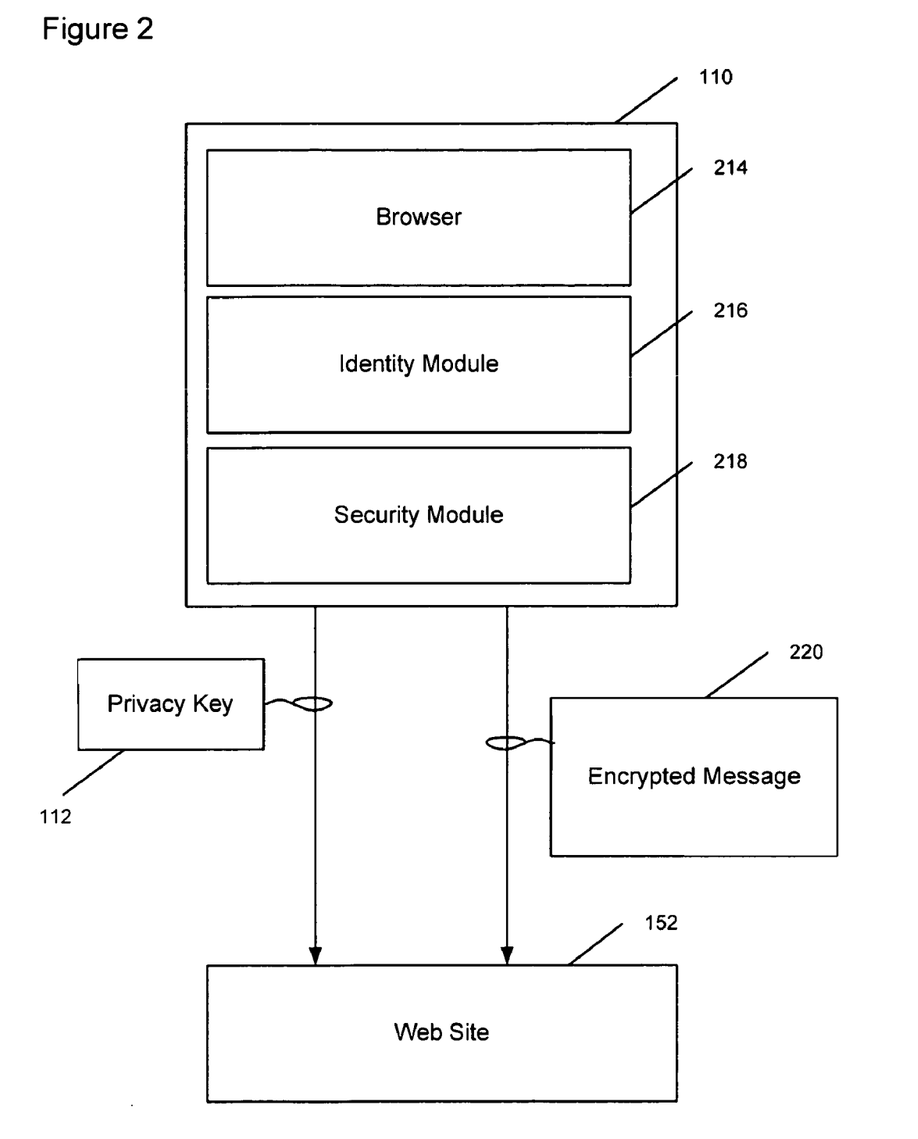
FIG. 2 illustrates example communications between the computer system and one of the web sites of FIG. 1.

Referring now to FIGS. 1 and 2, an example computing environment 100 includes a computer system 110, a network such as the Internet 130, and a plurality of web sites 152, 154, 156. Computer system 110 can be controlled by a user to communicate through Internet 130 with web sites 152, 154, 156.

Computer system 110 can be configured as a personal computer including at least one processor and memory. Computer system 110 includes one or more of volatile and non-volatile computer storage media, as well as removable and non-removable media implemented in any method or technology for storage of information such as computer readable instructions, data structures, program modules or other data. Computer system 110 includes an operation system, such as the WINDOWS operating system from Microsoft Corporation, and one or more programs stored on the computer readable media.

Computer system 110 also includes one or more input and output communication devices that allow the user to interact with computer system 110, as well as allow computer system 110 to communicate with other devices, such as web sites 152, 154, 156. The user of computer system 110 can access web sites 152, 154, 156 using a program on computer system 110 such as a browser 214. One example of a browser is the Internet Explorer browser offered by Microsoft Corporation. In one embodiment, browser 214 running on computer system 110 communicates with one or more of web sites 152, 154, 156 using the hypertext transport protocol secure ("HTTPS") protocol, although other protocols can be used.

In example embodiments, system 110 includes an identity module 216 that is programmed to maintain one or more digital identities associated with the computer user. In some embodiments, these digital identities are InfoCards that form part of the InfoCard system provided in the WINFX application programming interface developed by Microsoft Corporation of Redmond, Wash. The InfoCard system allows the user to manage multiple digital identities associated with the user, referred to as InfoCards. The InfoCard system utilizes a web services platform such as the Windows Communication Foundation in the WINFX application programming interface. In addition, the InfoCard system is built using the Web Services Security Specifications propagated at least in part by Microsoft Corporation of Redmond, Wash. These specifications include a message security model WS-Security, an endpoint policy WS-SecurityPolicy, a metadata protocol WS-MetadataExchange, and a trust model WS-Trust.

Computer system 110 also includes a security module 218 that is programmed to generate privacy keys 112, 114, 116. For example, system 110 generates privacy key 112 that is shared with web site 152. In example embodiments, privacy key 112 is a pair-wise key between the user of system 110 and web site 152. Security module 218 of system 110 is programmed to generate a different privacy key for each web site 152, 154, 156. System 110 and web sites 152, 154, 156 can, in turn, use the respective privacy key 112, 114, 116 to communicate securely. For example, system 110 can use privacy key 112 to generate an encrypted message 220 that is sent to web site 152. Web site 152 can, in turn, decrypt message 220, as described below.

Although privacy keys 112, 114, 116 are all associated with the user of system 110, each privacy key 112, 114, 116 is different. Because of this pair-wise nature, privacy keys 112, 114, 116 minimize the ability of web sites 152, 154, 156 to correlate the activities of the user of computer system 110 across the different web sites 152, 154, 156 based solely on use of privacy keys 112, 114, 116. For example, since privacy key 112, used to communicate with web site 152, differs from privacy key 114, used to communicate with web site 154, web sites 152, 154 cannot correlate the user's activities on web sites 152, 154 based solely on the keys used to communicate with web sites 152, 154.

In example embodiments, each privacy key 112, 114, 116 can be a symmetric key or an asymmetric key. An example privacy key is similar in structure to a public key, in that the privacy key is a binary number of a particular length, such as from 40 to 256 bits in length for symmetric keys and from 512 to 4096 bits for asymmetric keys. The primary difference between a privacy key and a public key is that a privacy key is not openly disseminated, but is instead sent to one or a select group of web sites. A user can have a plurality of different privacy keys, with one privacy key for each of the web sites (or each group of web sites) with which the user communicates.

In one embodiment, one or more of privacy keys 112, 114, 116 are symmetric keys based, for example, on algorithms like the Data Encryption Standard ("DES") or the Advanced Encryption Standard ("AES"). For example, a symmetric privacy key such as privacy key 112 is known both by the user of computer system 110 and by web site 152. A symmetric key can be used to sign and encrypt, but because it is shared among system 110 and web site 152, it is not possible to determine which party signed or encrypted a particular communication. Further, privacy key 112 is not shared with a third party (e.g., web sites 154, 156), since the third party could then pose as one or both of the user and web site 152.

In an alternative embodiment, one or more of privacy keys 112, 114, 116 are asymmetric keys based, for example, on the Rivest-Shamir-Adleman ("RSA") algorithm. In this embodiment, the user of system 110 has a secret key that is not shared, and web site 152 has privacy key 112 that can be used to encrypt messages sent to the user and to verify a signature made using the secret key. Since only the user of system 110 can sign with the secret key, it is possible for the resource to prove that the user signed a particular communication. This is commonly referred to as non-repudiation.

Additional details regarding the generation of privacy keys are described in U.S. patent application Ser. No. 11/074,885 filed on Mar. 7, 2005, the entirety of which is hereby incorporated by reference.

Figure 3:
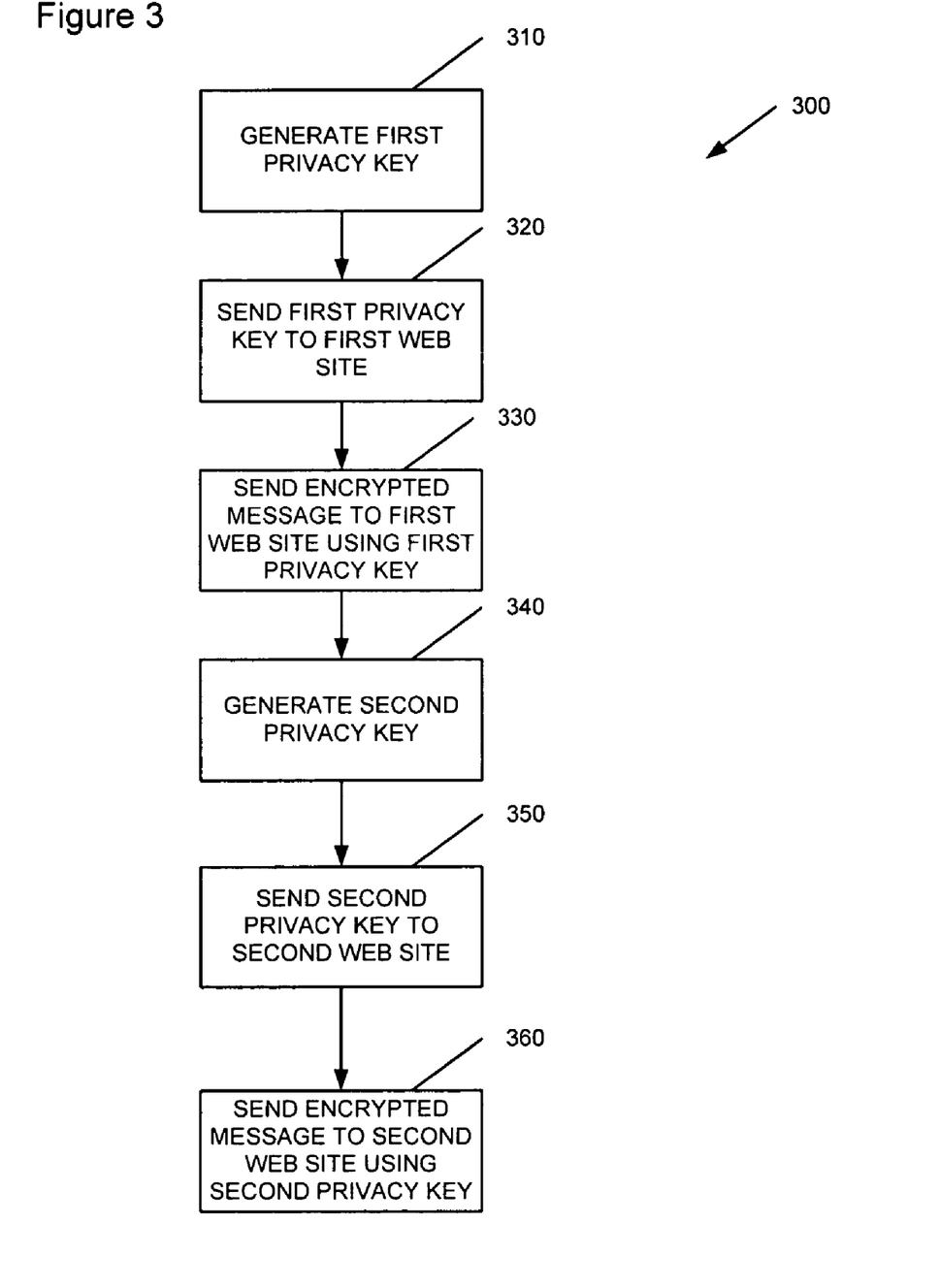
FIG. 3 illustrates an example method for using privacy keys.

Referring now to FIG. 3, an example method for using privacy keys is shown. At operation 310, the user's system generates a first privacy key. The first privacy key is sent to the first web site at operation 320. For example, in some embodiments the first privacy key can be securely sent to the first web site by using the public key associated with the first web site to encrypt the message including the first privacy key. The user can then send a signed message to the first web site using the first privacy key at operation 330 (using the first privacy key if the first privacy key is symmetric or a secret key if the first privacy key is asymmetric). Next, at operation 340, the user's system generates a second privacy key, and the second privacy key is sent to the second web site at operation 350. Next, the user can then send a signed message to the second web site at operation 360 (using the second privacy key if the second privacy key is symmetric or a secret key if the second privacy key is asymmetric). In example embodiments, the first and second web sites cannot correlate transactions by the user between the first and second web sites based solely on the privacy keys used in the communications between the user and the first and second web sites because the first and second privacy keys differ.

Referring again to FIG. 1, although computing environment 100 is configured to limit the ability of web sites 152, 154, 156 to correlate information about the user of system 110 based on the keys associated with communications between the user and web sites 152, 154, 156, it may be desirable for the user to allow for correlation in some situations.

For example, if web site 152 is an airline reservations web site, and web site 154 is a car rental web site that provides discounted rates for customers of the airline reservations web site, the user may want to allow for web sites 152, 154 to share user information so that the user can receive the discounted rates.

In such situations, the user can approve account linking 158 between web sites 152, 154. Account linking allows the user to decide when information about the user on web site 152 is shared with web site 154, and vice versa. The shared user information can include profile information, such as name, address, and telephone number, as well as transactional information, such as information about the goods and/or services purchased by the user. In the example shown, account linking 158 allows web site 152 to share information about the user, such as profile and transactional information, with web site 154. In example embodiments, privacy keys 112, 114 can be used to facilitate account linking 158.

For example, in one embodiment, two pair-wise asymmetric privacy keys, "$K_1$" and "$K_2$," are used at web sites $R_1$ and $R_2$. A human-readable policy "P" defining account linking is provided to the user for review. The policy "P" defines the way in which information will be shared between web sites $R_1$ and $R_2$. For example, the policy "P" can define what information is shared, how long the information is updated/shared, if the sharing is unidirectional or bidirectional, and what can be done with the shared information. "$S_K(L)$" represents a signature over the content L using key K, and "T" represents a timestamp. Based on this information, security module 218 is programmed to produce a coupon "C" according to an account linking agreement "L" as follows:

$$L = \{P, R_1, K_1, R_2, K_2, T\}; \text{ and}$$

$$C = L + S_{K1}(L) + S_{K2}(L).$$

As describe further below, the coupon "C" can be used to facilitate the sharing of user information between two web sites. In example embodiments, the linking agreement "L" is implemented as part of the InfoCard system, using an XML fragment incorporating the policy, the site identifiers, and the related privacy keys.

Figure 4:
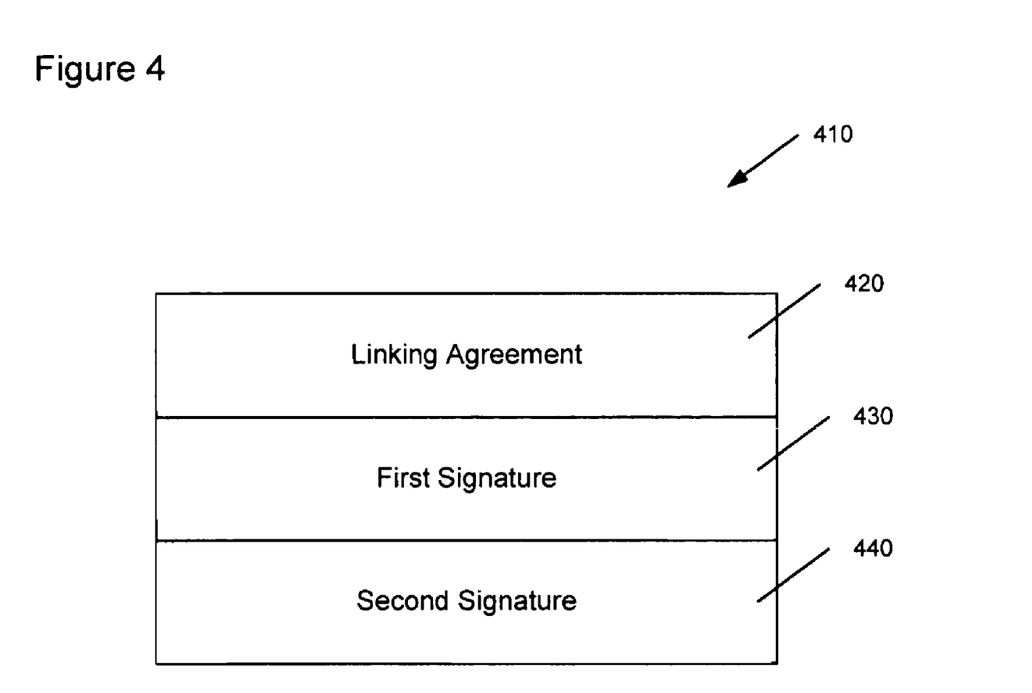
FIG. 4 illustrates an example coupon used to exchange user information between two web sites.

Referring now to FIGS. 1 and 4, an example coupon 410 is shown. Coupon 410 is a three-part extensible markup language ("XML") document including a linking agreement 420 and signatures 430, 440 encoded over linking agreement 420 using each of privacy keys 112, 114 employed at web sites 152, 154. In some embodiments, coupon 410 can be encoded as a security token in accordance with the security assertion markup language ("SAML") or the extensible rights markup language ("XrML"), although other languages can be used.

Coupon 410 can be used at either web site 152 or web site 154, and can be presented to the web sites 152, 154 in any order. The user of system 110 can give coupon 410 directly to each web site 152, 154, or either web site 152, 154 can forward it to the other to create account link 158. In this embodiment, non-repudiation is possible, and the user of system 110 can keep a copy of coupon 410 to indicate the policy under which the user approved account linking.

In an alternative embodiment employing symmetric privacy keys "$K_1$" and "$K_2$," because the secret key cannot be disclosed to third parties, a second pair-wise key is introduced at each web site $R_1$ and $R_2$ that serves as an identifier, and which can be shared with selected third parties similar to an asymmetric privacy key. For example, an identifier key "I" can be used. A coupon "C" such as coupon 410 can be produced from a linking Agreement "L" as follows:

$$L = \{P, R_1, I_1, R_2, I_2, T\}; \text{ and}$$

$$C = L + S_{K1}(L) + S_{K2}(L).$$

In this symmetric privacy key context, coupon 410 works at either web site 152, 154, and can be presented to web sites 152, 154 in any order. The user of system 110 can give coupon 410 directly to each web site 152, 154, or either web site 152, 154 can present it to the other. However, no proof is offered to either web site 152, 154 that the consumer owns the identity employed at the other web site. To obtain this assurance, web site 152 presents coupon 410 to web site 154 before linking the accounts at the two sites. Web site 154 can then verify the signature and existence of the account. Non-repudiation is not possible, since web sites 152, 154 are capable of applying the relevant signature as well as the user.

Figure 5:
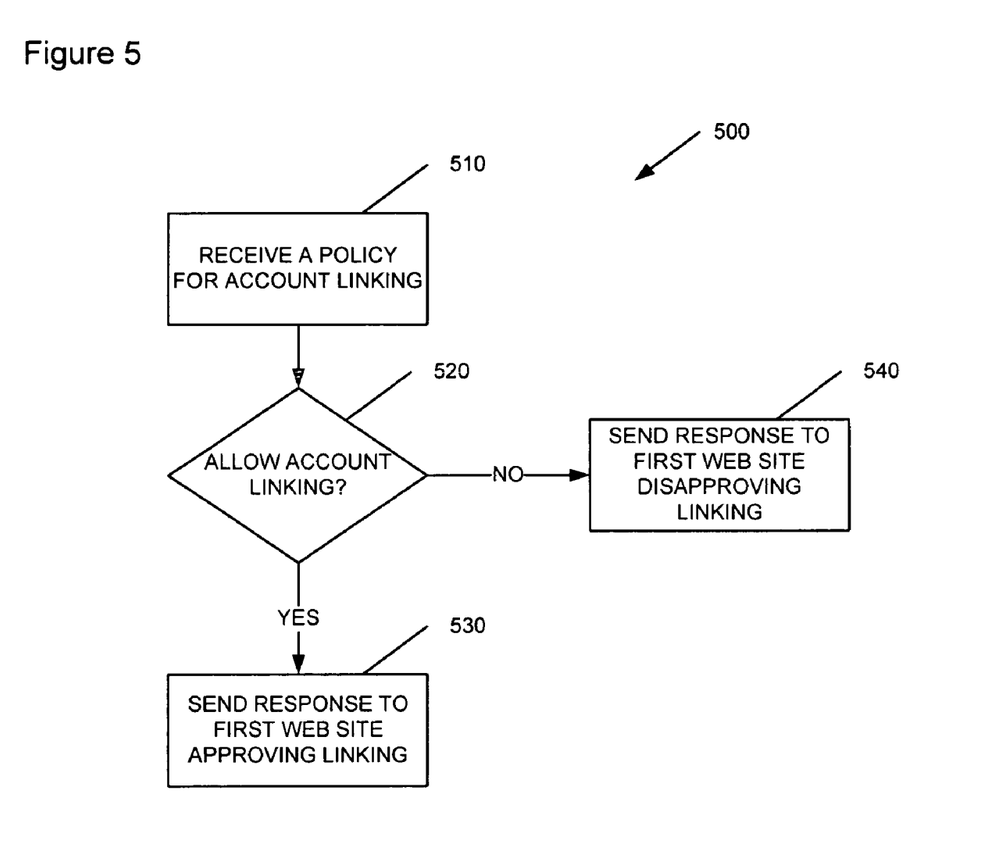
FIG. 5 illustrates an example method for implementing account linking between two web sites.

Referring now to FIG. 5, an example method 500 for implementing account linking is shown. Beginning at operation 510, the user receives a policy from a first web site regarding account linking with a second web site. Next, at operation 520, the user decides based on the policy whether or not to allow account linking. If the user chooses to allow account linking, control is passed to operation 530, and the user sends a response to the first web site approving the account linking. In example embodiments, the user's computer can generate a coupon, as described above, and forward the coupon to the first web site to approve the account linking. Alternatively, if the user decides at operation 520 not to allow account linking, control is passed to operation 540, and a response is sent to the web site disapproving of the account linking.

Figure 6:
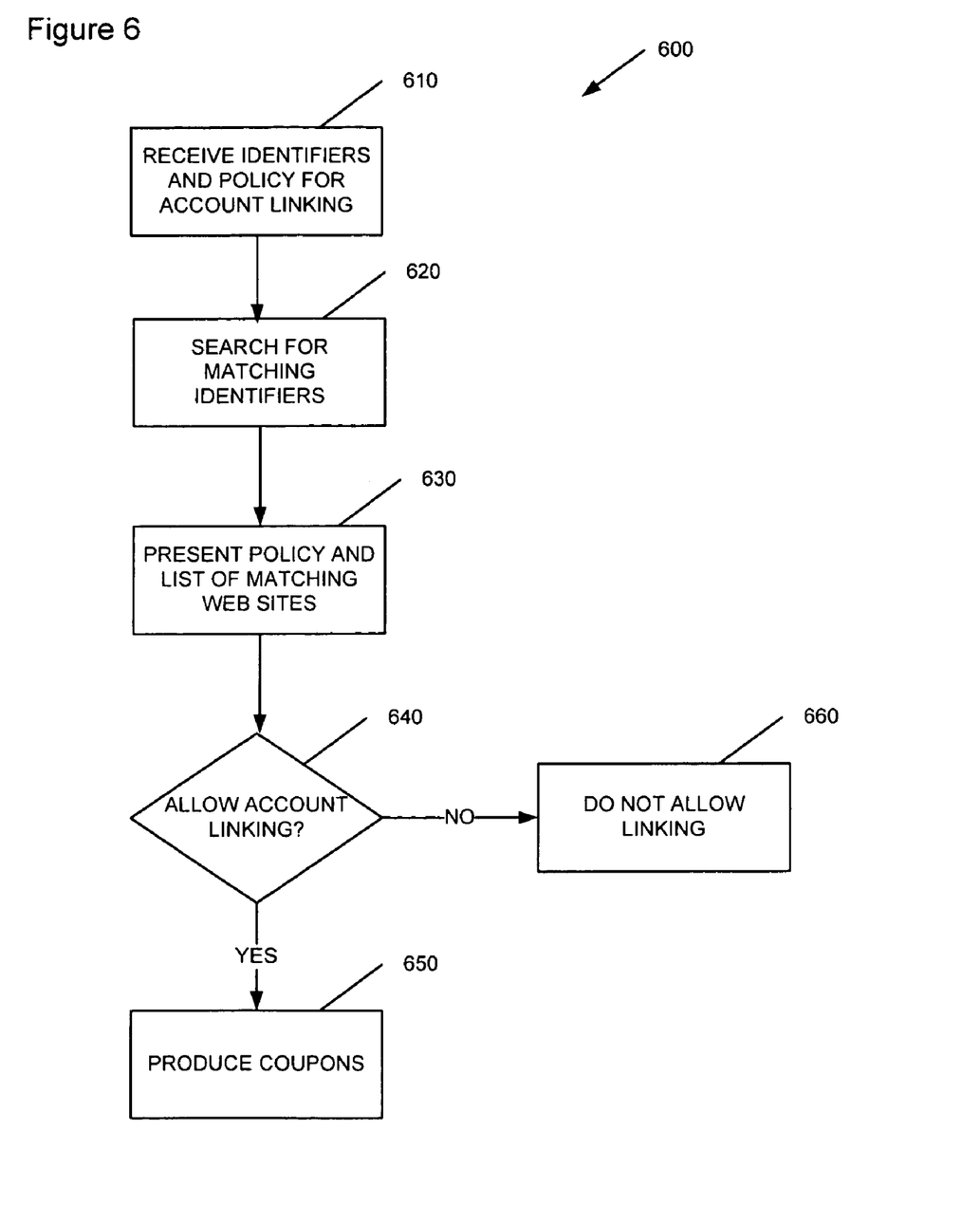
FIG. 6 illustrates an example method for a web site to request account linking with a plurality of other web sites.

Referring now to FIG. 6, in some embodiments, an example method 600 allows a web site to request account linking with a plurality of other web sites. For example, beginning at operation 610, the web site forwards to the user's computer a policy and a plurality of identifiers associated with web sites with which the web site desires account linking. In example embodiments, the identifiers are public keys associated with the web sites, although other unique identifiers, such as domain names, can be used.

Next, at operation 620, the user's computer searches a list of web sites with which the user has an existing relationship to determine if any of the identifiers match any of the web sites in the list. Next, at operation 630, the policy and the list of any matching web sites are presented to the user. The user is then allowed to decide whether or not to allow account linking for any of the web sites in the matched list at operation 640. If the user decides to allow account linking for any of the web sites listed, control is passed to operation 650, and a coupon is generated including the linking agreement and a two-way signature for the selected web sites. Alternatively, if the user decides at operation 640 not to allow account linking of any of the web sites listed, control is passed to operation 660, and account linking is not allowed for those web sites.

In example embodiments, method 600 can be implemented as part of the InfoCard system provided in the WINFX application programming interface developed by Microsoft Corporation of Redmond, Wash. The multiple digital identities stored by identity module 216 on computer system 110 can be searched when a web site requests account linking to determine if the user has existing accounts with any of the web sites in the request.

For example, in response to receiving a request from a web site for account linking with a plurality of web sites, the user's computer system is programmed to search the InfoCards associated with the user, that are stored on the user's system, that have been used to establish accounts at any of the web sites in the request. InfoCards that match the web sites in the request are presented to the user. The user can decide whether or not to allow account linking by reviewing the policy and the matched InfoCards for the web sites.

In some embodiments, account linking is implemented as part of the registration process for a web site, such as web site 152. For example, when the user registers with web site 152, the policy for the web site solicits account linking information in addition to other registration information. This account linking information can include the identifiers (e.g., public keys or domain names) of the web sites with which account linking is desired, such as web site 154. If the user has an existing account with web site 154, the user is presented with the option for account linking with web site 154 during the registration process of web site 152, and the user can approve/disapprove of account linking between web sites 152, 154. In addition, identity module 216 can be programmed to allow the user to track which sites the user has approved for account linking.

Figure 7:
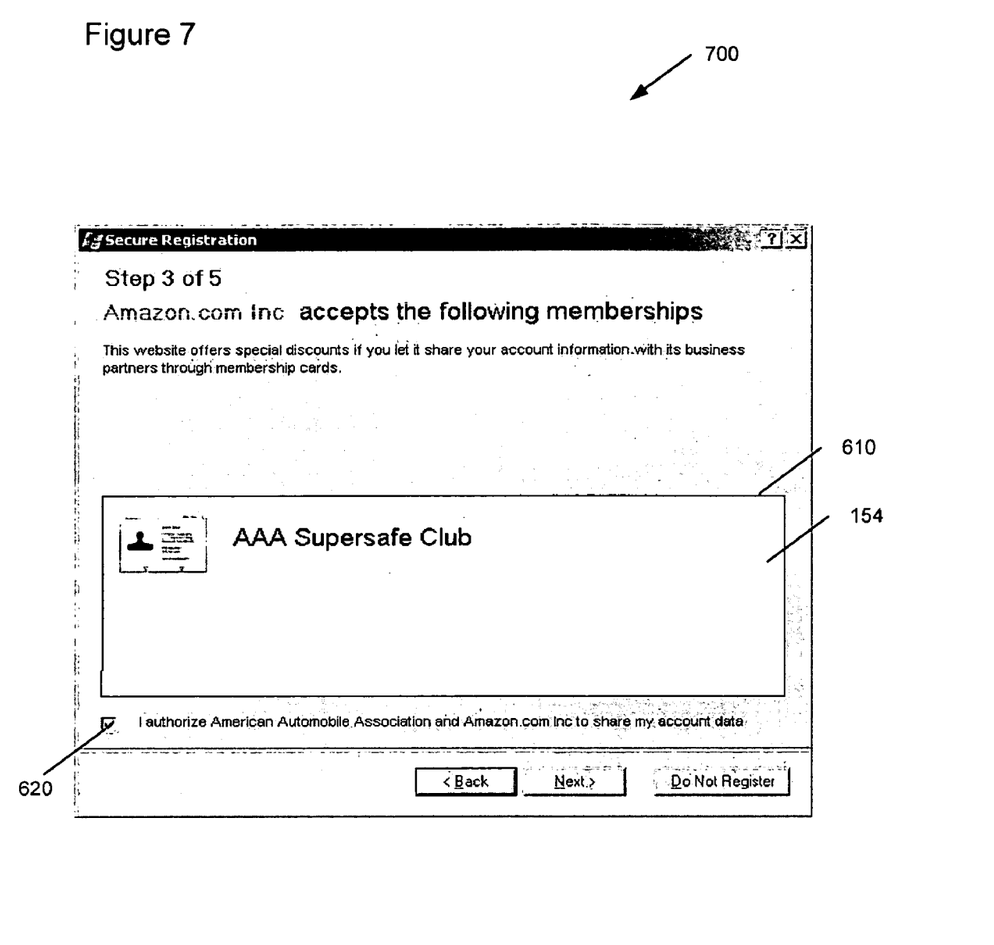
FIG. 7 illustrates an example graphical user interface for presenting account linking information to a user.

For example, referring now to FIG. 7, during the registration process with web site 152, the user is presented with a graphical user interface 700. User interface 700 can be presented within browser 214 or as a separate interface on computer system 110. Interface 700 provides a window 610 with a list of all of the web sites with which web site 152 requests account linking and the user has an existing relationship. For example, window 610 lists web site 154 for which account linking is requested by web site 152 and with which the user has an existing account. The user can authorize account linking for web sites 152, 154 by checking box 620. Alternatively, the user can disallow account linking by leaving box 620 unchecked and continuing with the registration process for web site 152. If multiple web sites are listed in window 610, multiple check boxes can be provided so that the user can select with which, if any, web sites to allow account linking.

Figure 8:
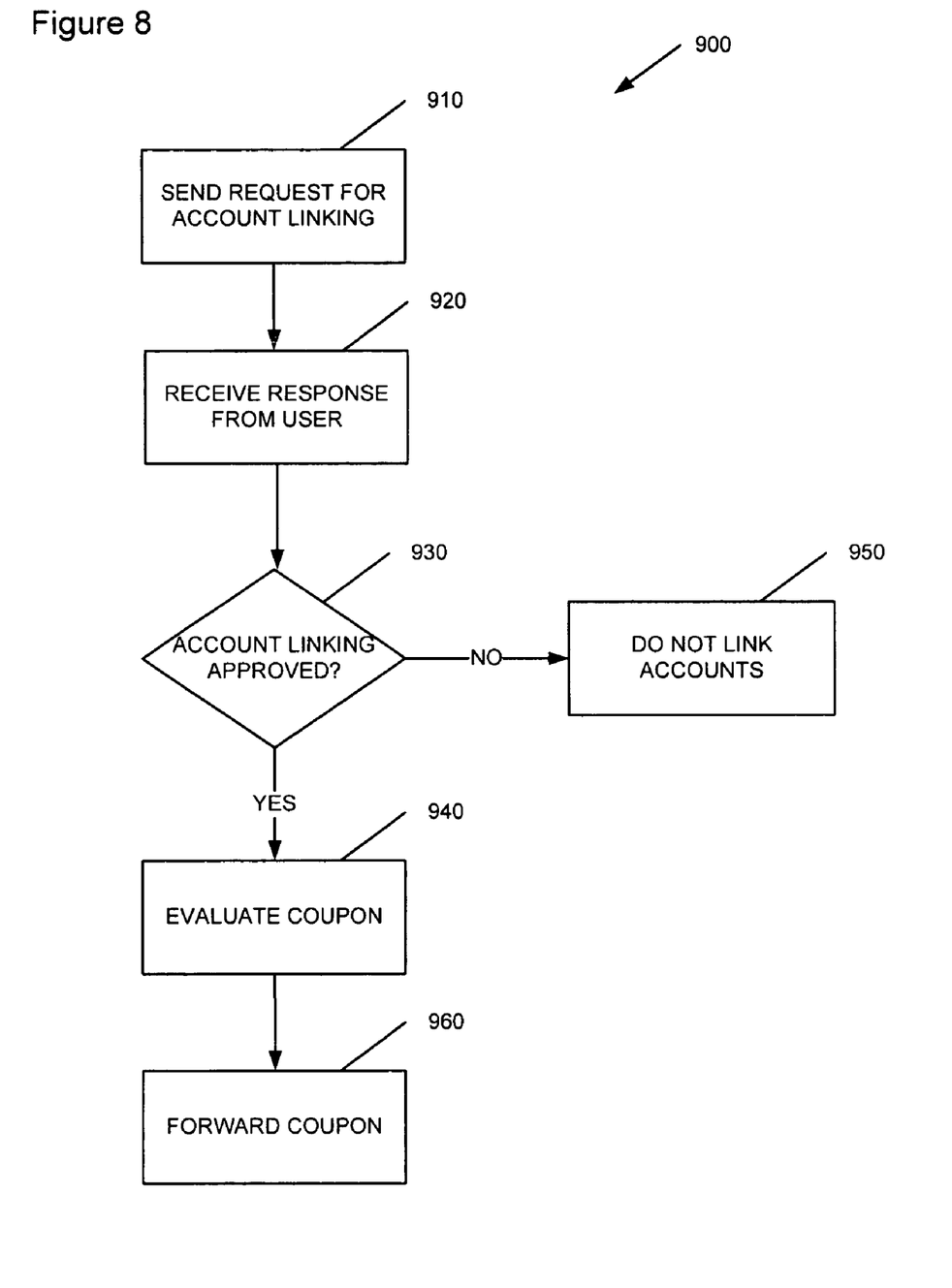
FIG. 8 illustrates an example method for a web site to request and implement account linking.

Referring now to FIG. 8, an example method 900 for a first web site to request and implement account linking is shown. At operation 910, the first web site sends a request for account linking to a user. Next, at operation 920, the web site receives the response from the user. At operation 930, the web site determines if the user has approved of account linking. If account linking has not been approved, control is passed to operation 950, and account linking is not implemented.

Alternatively, if account linking is approved by the user, control is passed to operation 940, and the first web site evaluates the coupon received from the user to verify the signatures in it, such as coupon 410 described above. Next, at operation 960, the first web site exchanges the coupon with the second web site to implement account linking and to obtain profile information about the user from the second web site.

In example embodiments, the first web site can exchange a coupon with the second web site using the protocols defined in the web services platform such as the Windows Communication Foundation provided in the WINFX application programming interface developed by Microsoft Corporation of Redmond, Wash. For example, the first web site can forward a coupon and profile information to the second web site by sending a request security token ("RST") in accordance with the issuance mechanism provided in WS-Trust. An example RST including a coupon is shown below.

```
<RequestSecurityToken>
    <TokenType>
        urn:...:TokenType:AccountLinking
    </TokenType>
    <Claims>
        <Claim URI="http://.../account-linking/claims/AccountId"/>
        <Claim URI="http://.../account-linking/claims/MembershipLevel"/>
        <Claim URI="http://.../account-linking/claims/MembershipStatus"/>
    </Claims>
    <AccountLinkingAuthorizationToken>
        [Coupon from user that authorizes account linking is inserted here]
    </AccountLinkingAuthorizationToken>
</RequestSecurityToken>
```

The second web site can respond to such a request by sending a request security token response ("RSTR") back to the first web site, an example of which is provided below.

```
<RequestSecurityTokenResponse>
    <TokenType>
        urn:...:TokenType:AccountLinking
    </TokenType>
    <RequestedSecurityToken>
        <AccountLinkingToken>
            [Custom token containing account linking information is inserted
            here]
        </AccountLinkingToken>
    </RequestedSecurityToken>
</RequestSecurityTokenResponse>
```

In example embodiments, the security tokens issued by the first and second web sites can be generated in one or more of a plurality of formats including, without limitation, X509, Kerberos, SAML (versions 1.0 and 2.0), Simple eXtensible Identity Protocol ("SXIP"), etc.

One or more advantages are associated with the systems and methods described herein. For example, the use of privacy keys can enhance the privacy of users in the online environment. Further, the use of account linking allows users to decide when and how information associated with the users is shared between web sites.

Although the examples described herein reference web sites, in alternative embodiments, privacy keys and account linking can be used with other online resources as well. For example, in alternative embodiments, rich client applications accessing web services over the Internet using the Web Service standard protocols defined in the WS-* suite can utilize privacy keys and account linking. For example, in one alternative embodiment, a dedicated rich client application that allows a user to trade stocks and manage a portfolio with a brokerage can initiate account linking between the brokerage account and the user's bank account. Other alternatives are possible.

The various embodiments described above are provided by way of illustration only and should not be construed to limiting. Those skilled in the art will readily recognize various modifications and changes that may be made to the embodiments described above without departing from the true spirit and scope of the disclosure or the following claims.

What is claimed is:

1. A computer system, the computer system comprising:
a processor unit; and
a computer-readable storage medium storing instructions that, when executed by the processor unit, cause the processor unit to:
generate a first encryption key and a second encryption key different from the first encryption key, the computer system using the first encryption key to encrypt communications with a first web site, and the computer system using the second encryption key to encrypt communications with a second web site;
receive a request to link a first user account with a second user account, the computer system receiving the request from the first web site, the first user account being associated with the first web site, the second user account being associated with the second web site;
present a first option to link the first user account and the second user account, the first option being presented to a user of the computer system;
generate a coupon comprising a linking agreement, the first encryption key, and the second encryption key in response to the user of the computer system approving linking between the first user account and the second user account;
present a second option to the user of the computer system to forward the coupon to the first web site directly from the computer system; and
forward the coupon to the first web site when the user selects the second option.

2. The computer system of claim 1, wherein the request for the linking of the first and second user accounts from the first web site includes a policy defining how information in the first and second user accounts will be shared between the first and second web sites.

3. The computer system of claim 1, wherein the request from the first web site includes requests for linking accounts from a plurality of web sites, and wherein a search is performed for one or more digital identities on the computer system that match one or more of the plurality of web sites.

4. The computer system of claim 3, wherein the user of the computer system is presented with options for linking user accounts associated with matching digital identities.

5. A method for communicating with a plurality of web site devices, the method comprising:
generating, at a computer system, an encryption key for encrypting communications with each of the plurality of web site devices, wherein a unique encryption key is generated and associated with each of the plurality of web site devices;
receiving, at the computer system, a request for account linking from a first web site device of the plurality of web site devices to share user information with at least a second web site device of the plurality of web site devices;
searching, at the computer system, for digital identities associated with a user that match the first web site device and the at least a second web site device;
presenting, at the computer system, the user with an option to approve or disapprove of the account linking for web site devices with matching digital identities;
generating, at the computer system, a coupon in response to the user approving of the account linking, the coupon facilitating the account linking and including a linking agreement and at least a first encryption key associated with the first web site device and a second encryption key associated with the at least a second web site device;
presenting an option to the user of the computer system to forward the coupon to the first web site device directly from the computer system; and
forwarding the coupon to the first web site when the user selects the option.

6. A method for a first web site device to link user accounts with a second web site device, the method comprising:
sending a request for account linking to a user computer system from the first web site device to share user information with the second web site device;
receiving a response at the first web site device from the user computer system approving of the account linking;
forwarding a coupon generated by the user computer system from the user computer system to the second web site device to initiate the account linking, the coupon including a linking agreement, a first encryption key associated with the first web site device, and a second encryption key associated with the second web site device, the first and second encryption keys being different and being used to encrypt communications with the first and second web site devices, respectively;
presenting an option to a user of the user computer system to forward the coupon to the first web site device directly from the user computer system; and
forwarding the coupon to the first web site when the user selects the option.

7. The method of claim 6, further comprising receiving, at the first web site device, the coupon from the user computer system.

8. The method of claim 6, further comprising verifying the coupon at the first web site device.

9. The method of claim 6, wherein sending the request further comprises sending the request for the account linking during a registration process of the first web site device for the user computer system.

10. The method of claim 6, wherein sending the request further comprising sending a policy to the user, the policy defining how the user information is shared with the second web site device.

* * * * *